United States Patent

Ogiwara

[11] 4,043,747
[45] Aug. 23, 1977

[54] PRESSURE HEAT FIXING DEVICE

[75] Inventor: Masuji Ogiwara, Ebina, Japan

[73] Assignee: Rank Xerox Ltd., London, England

[21] Appl. No.: 726,867

[22] Filed: Sept. 27, 1976

[30] Foreign Application Priority Data

Aug. 22, 1975 Japan .............................. 50-114947

[51] Int. Cl.$^2$ .............................................. G01K 1/14
[52] U.S. Cl. ........................................ 432/60; 73/340;
73/351; 236/15 BC; 219/469
[58] Field of Search ............... 432/59, 60, 227, 228;
355/3 FU; 219/216, 469; 73/351, 340; 236/15 BC

[56] References Cited

U.S. PATENT DOCUMENTS

| | | | |
|---|---|---|---|
| 3,203,678 | 8/1965 | Sawyer et al. | 236/15 BC |
| 3,357,249 | 12/1967 | Bernous et al. | 73/351 |
| 3,690,176 | 9/1972 | Connolly et al. | 355/3 FU |
| 3,849,628 | 11/1974 | Abowitz et al. | 219/216 |
| 3,918,397 | 11/1975 | Thetter | 432/60 |
| 3,933,149 | 1/1976 | Salera et al. | 73/340 |

Primary Examiner—John J. Camby
Assistant Examiner—Henry C. Yuen

[57] ABSTRACT

A pressure heat fixing device consisting of a pair of heated fixing rollers rotating in pressure contact with one another and a temperature means supported to contact with the surface of the heated fixing roller, characterized by the provision of a suitable driving means adapted to reciprocatingly displace the said temperature detecting means along with and parallel to the axis of the heated fixing roller.

1 Claim, 2 Drawing Figures

PRESSURE HEAT FIXING DEVICE

The present invention relates to improvements in a pressure heat fixing device for use in an electrophotographic copying machine.

As a pressure heat fixing device in an electrophotographic copying machine, there has been widely used the heated roller fixing system. The heated roller fixing system includes a pair of rollers, the surface of which is coated with a releasing substance such as tetrafluoroethylene resin or silicone rubber to prevent the adherence of the resinous powders (to be referred to hereinafter simply as toners) on the roller surface, and at the center of one or both of which there is provided a heating element such as infrared ray lamp. The construction of the heated roller system is such that when a support bearing a toner powder image is passed between the rollers held in a pressurized condition, fixing is effected due to the pressure and heat. The system described offers the advantages that it operates at relatively low electric consumption and there is no risk of fire hazard. However, the system suffers on the other hand from the disadvantages which will be described hereinafter.

Figure 1:
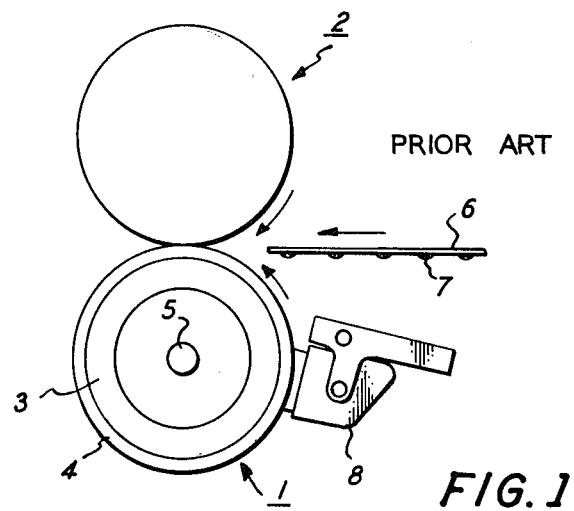
Figure 2:
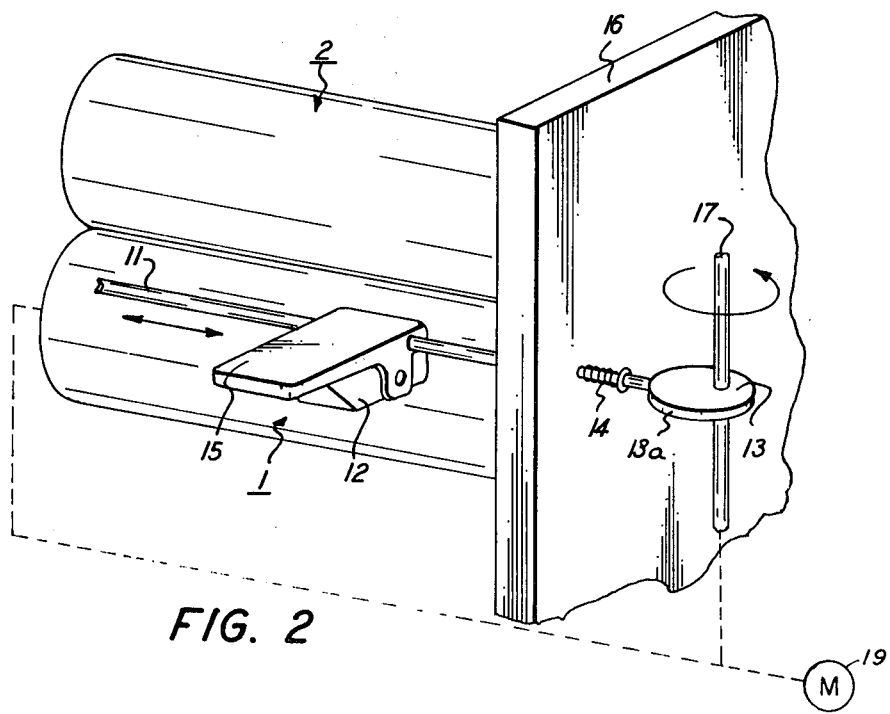

FIG. 1 is a schematic side view of the conventional pressure heat fixing device and FIG. 2 is a schematic perspective view of an embodiment of the invention.

Reference numerals 1, 2 designate heated fixing rollers and 12 indicates a temperature detector.

As shown in FIG. 1 the conventional heated roller fixing system comprises a pair of heated fixing roller 1 and 2, the circumferential surface of the roller 1 being coated with a layer 4 to prevent toner adherence. A heating element 5 is provided at the central part of the roller 1. The support 6 carrying a toner image 7 is to be passed between the roller 1 and 2 for fixing of the toner powder image 7. To obtain the optimal temperature condition of fixing, there is provided at the peripheral portion of the heated roller 1 temperature detector 8 which controls the heating element 5 in response to the detected temperature. However, during the usage over a long time period, the coated layer of the heated roller 1 is abraded due to the toner powders attached on the detector 8 so that a homogenious fixing may not obtained any more.

The present invention contemplates to eliminate the above described disadvantage and has, for its object, to provide a pressure heat fixing device in which the temperature detecting means for sensing the surface temperature of the heated fixing roller is moved reciprocatingly parallel to the axis of the heat roller during the rotation thereof so as to prevent inadequate fixing due to local abrasion of the coatings of the heated roller.

The present invention will now be described hereinafter with reference to a form of realization illustrated in FIG. 2. In the Figure, there are shown a pair of heated fixing rollers 1 and 2 having similar construction to the conventional heat fixing rollers, a shaft 11 provided in the vicinity of the roller 1 and parallel to the longitudinal axis of the roller. A temperature detecting instrument 12 is secured to the shaft 11 by means of a bracket 15 so that the sensor thereof is placed at a close vicinity of the roller surface. An end of the shaft 11 penetrates the supporting plate 16 supporting the heating roller 1 and 2 and extends outwards therefrom. Secured to the exterior side of the supporting plate 16 is a driving shaft 17 which moves conjointly with the rotation of the heat roller 1 and 2 as provided by a suitable drive 19, the driving shaft 17 being provided with an eccentric cam 13. An end of the shaft 11 biased by a compression spring 14 is arranged to bear against the cam surface 13a of the eccentric cam 13 so that the shaft 11 moves reciprocally parallel to the heated fixing roller 1 in response to the rotation of the eccentric cam 13.

As the eccentric cam 13 rotates along with the rotation of the heat rollers 1 and 2, the temperature detector 12 moves reciprocally by means of the movement of the shaft 11. As a consequence, the toner powders adhering to the temperature detector 12 are caused to contact a wider surface area of the heating roller, thereby eliminating the risk of the roller surface to be abraded locally.

In order to prove the effects of the present invention, the surface of a heat fixing roller is coated with a layer 4 of KE 12 RTVC (made by Shinetsu Chemical) of 700 microns thick and the layer has been subjected to a frictional contact with a temperature detector having on its surface a sensor made of copper. As a result, in a conventional heat fixing device employing a stationary temperature detector, stripes have been observed on the surface of the roller at 3,000 sheets of copying and the coated layer 4 has been abraded at 20,000 sheets of copying due to abrasion by the temperature detector, while in the heat fixing device employing the temperature detector designed to be moved reciprocally, stripes have been observed only after 15,000 sheets of copying operation and the abrasion of the coating layer by the temperature detector has not been observed until 60,000 sheets when the amplitude of movement of the detector is 35 mm. Clearly, the above mentioned experiments are effected under the same fixing conditions.

As the material for forming the coating layer 4 of heat fixing roller 1, silicone rubber, tetrafluoroethylene and fluorocarbon resin are also effective. Although in the above described embodiment the temperature detector 12 is arranged to be moved by the eccentric cam, it is nevertheless suitable to employ any other means such as link mechanism for the same purpose.

Since according to the present invention, as above described, the temperature detecting means for sensing the surface temperature of the heat fixing roller is designed to be moved in response to the rotation of the roller in a direction parallel to the roller so that the detector contacts a larger area of the surface of the heat fixing roller, the heat fixing device of the invention enables to avoid of the local abrasion that would be caused due to toner powders adhering to the sensor of the detector, thereby preventing the risk of inadequate fixing due to abrasion of the coating layer.

What is claimed is:

1. In a pressure heat fixing device comprising a pair of heated fixing rollers rotated in pressure contact with one another and at least one of said rollers having its surface temperature detected by a temperature detecting means in surface contact therewith, the improvement comprising, temperature detection means pivotally mounted on a shaft member to contact the surface of said roller, said shaft member extending parallel to the longitudinal axis of said roller, drive means for imparting a reciprocating movement to said shaft member to move said temperature detection means in a first direction parallel to the axis of said roller and then a second direction opposite said first direction, said drive means including an eccentric cam member drivingly coupled to said roller whereby upon rotation of said roller said cam member is rotated to effect movement in a first direction and spring means arranged between said shaft member and said cam member to effect movement in a second direction upon continued rotation of said roller and cam member.

* * * * *